United States Patent Office
2,902,072
Patented Sept. 1, 1959

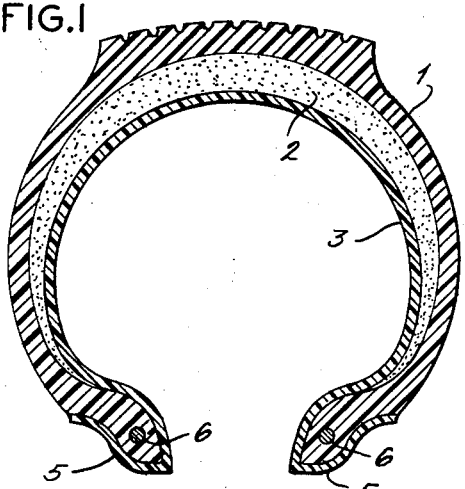
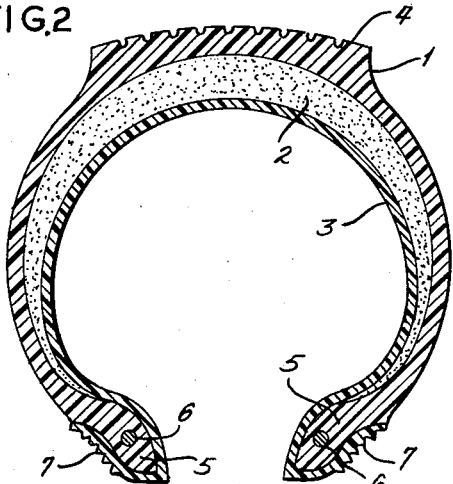
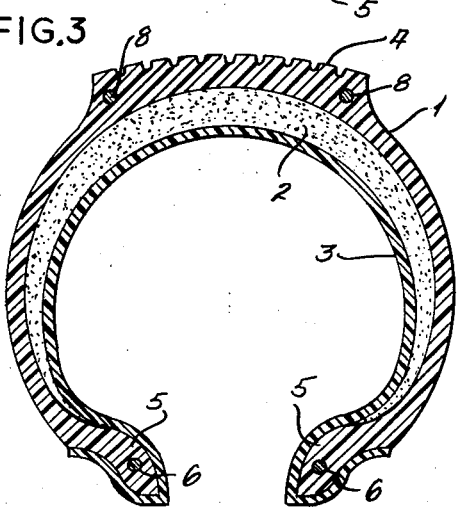
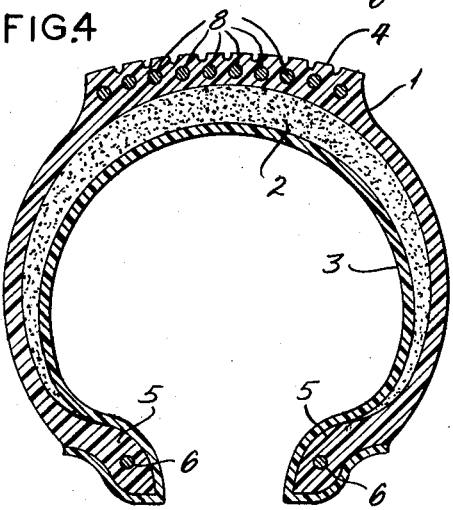
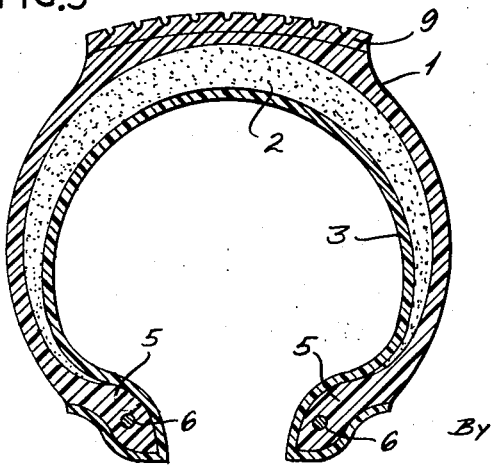

2,902,072

VEHICLE TIRE

Franz Gottfried Reuter, Lemforde, Hannover, Germany, assignor, by mesne assignments, to Mobay Chemical Company, Pittsburgh, Pa., a corporation of Delaware Application July 24, 1958, Serial No. 750,826

Claims priority, application Germany July 27, 1957

5 Claims. (Cl. 152—330)

This invention relates generally to vehicle tires and, more particularly, to such a tire made of polyurethane plastic.

Substantially nonporous rubber-like polyurethane plastics have an abrasion resistance much better than that of rubber and for this reason tires made from such polyurethane plastics have been suggested heretofore as a substitute for the conventional rubber tires. A suitable penumatic tire made entirely from polyurethane plastics has not been available commercially, however, because it has been impossible to prepare such a tire having all of the physical characteristics required for proper functioning. Recognizing the problem of building the carcass of the tire from a polyurethane plastic, it has been proposed to prepare the carcass from a suitable material, such as, a butadiene styrene copolymer, and to adhesively bind a tread of polyurethane to this carcass. Tires of this type are disclosed in U.S. Patents 2,713,884 and 2,749,960. Tires of this type present an adhesive problem, however, and have not been entirely suitable for commercial production.

It is, therefore, an object of this invention to provide a novel and improved tire for vehicles having both side walls and tread of polyurethane plastic. Another object of the invention is to provide a tire for vehicles made from polyurethane plastics and having improved wear characteristics and elasticity. Still another object of the invention is to provide a tire which can be made by a method less expensive and simpler than the method required to build the heretofore available cord reinforced rubber pneumatic tires.

Other objects will become apparent from the following description with reference to the accompanying drawings in which—

Figure 1 is a cross section of an embodiment of a tire adapted for use with a tube on motor vehicles;

Figure 2 is a cross section of a tire adapted for use without a tube on motor vehicles;

Figure 3 is a cross section of another embodiment of the invention having reinforcing strands;

Figure 4 is another embodiment of a reinforced tire; and

Figure 5 illustrates a further embodiment of the invention having a tread applied to the carcass after the carcass has been formed.

Generally speaking, the foregoing objects and others are accomplished in accordance with this invention by providing a vehicle tire having a substantially nonporous, rubber-like polyurethane tread and a carcass having inner and outer side walls with a layer of rubber-like cellular polyurethane sandwiched therebetween. If the tire is to be a tubeless type of tire, both the outer and inner walls are made from a nonporous polyurethane which is gas impermeable.

The tire of this invention does not require a woven cord support, and it may be formed by a continuous casting process in which the various layers are cast one after the other. In accordance with one embodiment of such a process, sufficient casting resin for making the outer wall and tread of the tire is introduced into the mold first, then the components which react to form the rubber-like cellular polyurethane are added and finally the mold is filled with substantially nonporous polyurethane to form the inner wall or layer of the tire. Alternately, the tread and outer wall may be molded and assembled with a layer of cellular polyurethane which has already been formed and then a soft layer of polyurethane may be cast over the cellular polyurethane.

Any suitable polyurethane composition which will produce a substantially nonporous, rubber-like polyurethane may be used for the inner and outer walls and tread. The compositions disclosed in U.S. Patents 2,729,618; 2,621,166 and 2,620,516 may be used for this purpose. If desired, that portion of the mold which will form the tread may be formed with one composition which is adapted to form a polyurethane having an especially high abrasion resistance and one or more other polyurethane compositions may be fed into the mold to form the outer wall thereby furnishing a side wall having a more desirable elasticity than that of the tread. In fact, the elasticity of the side walls of the tire can be varied by varying the composition of the resin fed into the mold. The elasticity can be increased by adding to the polyurethane melt any suitable alkali metal salt of an organic fatty acid or aryl sulfonates, alkyl sulfonates, or alkylaryl sulfonates. The larger the quantity of these materials used, the more elastic the resulting polyurethane. Usually from about 0.01 percent to about 0.5 percent of the casting composition used for making the side walls will be one of these materials. Examples of suitable alkali metal salts are sodium oleate, potassium oleate, sodium stearate, potassium stearate, lithium linoleate, and the like. Dioctyl sodium sulfosuccinate, isopropyl naphthylene sodium sulfonate, and the like.

The bead of the tire provided by this invention is provided with a continuous iron wire strand as is conventional in rubber tires. A tire to be used as a tubeless tire is provided with the conventional sealing lip used in rubber tires and adapted to be held against the wheel rim when the tire is inflated. The strength of the tread may also be increased by imbedding wire strands therein.

Although the invention is described in considerable detail with respect to tires for motor vehicles, such as automobiles, it is, of course, to be understood that the tire provided by this invention may be used for any other vehicle, such as, for example, airplanes, bicycles, farm implements, and the like.

Best results have been obtained when the polyurethane is prepared from a linear polyester produced by esterification of a dicarboxylic acid and a dihydric alcohol. Examples of suitable acids and alcohols are disclosed in U.S. Patent 2,729,618 and include adipic acid, succinic acid, malonic acid, ethylene glycol, diethylene glycol, butylene glycol and the like. The polyester should have a molecular weight of at least about 500 and preferably an hydroxyl number of not more than about 225 and an acid number of from zero to about 5. The polyester is reacted with an organic diisocyanate to form a polyurethane. Suitable diisocyanates include toluylene diisocyanate, para-phenylene diisocyanate, naphthylene-1,5-diisocyanate, 4,4'-diphenylmethyl diisocyanate, and the like.

A suitable polyalkylene ether glycol, such as is prepared by the condensation of an alkylene oxide or polythioether prepared by condensation of a thioglycol and having a molecular weight of at least about 500, may be substituted for the polyester in preparing the polyurethane. Suitable alkylene oxides include ethylene oxide, propylene oxide, butylene oxide, and the like. Tetrahydrofuran may also be polymerized to prepare the polyalkylene ether glycol having a molecular weight of at least 500.

The intermediate layer of cellular polyurethane is made by reacting an organic compound having reactive hydrogen atoms, such as, for example, a polyester or polyalkylene ether glycol having a molecular weight of at least 500 with an organic polyisocyanate, and a mixed chain extender or cross-linker of water and organic chain extender. This product has a density of more than about 5 pounds per cubic foot and most often a density within the range of from about 25 pounds to about 35 pounds per cubic foot. A product having a density within this latter range is preferred for the intermediate layer of the carcass of the tire of this invention. This cellular polyurethane is not to be confused with the one ordinarily made with water alone as the cross linker and ordinarily used for making upholstery, sponges, carpet underlays, and the like. The product used in making the intermediate layer of the tire of this invention is a much more dense product. Usually the cellular polyurethane prepared with water alone as the cross linker has the density of 3 or less pounds per cubic foot. Moreover, the cellular product contemplated by this invention has a greater tensile strength than the cellular polyurethane prepared from water alone as the cross linker. The tensile strength of the cellular polyurethane used in the tire should be within the range of from about 65 p.s.i. to about 1500 p.s.i. and preferably within the range of from about 500 p.s.i. to about 1500 p.s.i. The tensile strength of the cellular polyurethanes prepared from water alone as a cross linker never appreciably exceeds 20 pounds per square inch. The tensile strength of the substantially nonporous, rubber-like polyurethane used for making the tread and the outer and inner walls of the side walls is from about 4,000 pounds per square inch to about 7,000 pounds per square inch. This latter product is made with an organic cross linker alone. That is, no water is used to cross link the casting resin used for making the tread or the inner or outer walls of the side walls of the tire.

In preparing a tire in accordance with one embodiment of this invention, a cellular polyurethane is prepared in accordance with the following process.

About 1.5 kilograms of a polyester prepared by esterification of adipic acid and ethylene glycol and having an OH number of about 58 are dehydrated by heating at 130° C. for about 2 hours. The dehydrated polyester is reacted under substantially anhydrous conditions with about 275 grams of para-phenylene diisocyanate at about 115° C. for about 15 minutes. The resulting prepolymer has terminal groups which are predominately isocyanate groups. After cooling to about 80° C., it is mixed with about 48 cubic centimeters of a mixture of about 80 parts by volume of the sodium salt of sulfonated castor oil (water content 54 percent), about 20 parts by volume of trimethylol propane and about 0.5 part by volume of hexahydrodimethyl aniline. Mixing may be performed at about 50° C. in a double screw extruder. The mixture is then transferred to an open mold before any substantial amount of chemical reaction. In the mold, a rubber-like polyurethane with fine pores is obtained having the following properties:

Density _____ kg./m.³__ 82
Resiliency _____ percent__ 44
Tensile strength _____ kg./cm.²__ 4.67
Elongation at break _____ percent__ 453
Tear strength _____ kg./cm.__ 2.89

A suitably shaped piece is cut from a slab of this product. After the tread and the outer side wall of a tire has been cast from a composition prepared in accordance with Example 9 of U.S. Patent 2,729,618, using the second formulation thereof, the cellular polyurethane layer is placed against the nonporous polyurethane in the mold. The hardness of the tread and outer layer is about Shore A 88°. An inner layer is then cast over the exposed surface of the cellular layer to form the tire. As pointed out hereinbefore, the cellular layer may be cast by pouring the reaction mixture into a suitable mold and against the already cast nonporous tread and outer layer, if desired. In this way, the porous layer is cast in place.

Referring now to the drawings, a tire adapted to be used with a tube is illustrated in Figure 1. This tire is provided with a gas impermeable polyurethane layer 1 and polyurethane tread 4 cast from the nonporous polyurethane prepared in accordance with the second formulation of Example 9 of U.S. Patent 2,729,618. The inner intermediate layer 2 is a cellular polyurethane prepared in accordance with the method described above. The inner gas impermeable layer 3 is a substantially nonporous polyurethane having a Shore A hardness of about 67° prepared with Example 1 of U.S. Patent 2,729,618. As illustrated in the drawing, the tread surface is profiled in accordance with conventional procedure and this portion of the tire is thicker than that of the side walls. Circular wire strands 6 are imbedded in beads 5 to increase the strength thereof and to prevent tearing as the tire is mounted on a wheel. A conventional inner tube adapted to be inflated with air is used with this tire.

A tubeless type tire is illustrated in Figure 2 and has tread 4, outer wall 1 and inner wall 3 cast of substantially nonporous polyurethane of the types used in the tire of Figure 1. Intermediate layer 2 is a porous rubber-like polyurethane prepared in accordance with the process described above. Bead 5 is provided with wire strands 6 and sealing lips 7. Note that the outer surface of the lips may be of the softer polyurethane used for making the inner wall of the tire.

Figures 3 and 4 illustrate tires having wires 8 imbedded in the tread. Otherwise these tires are of substantially the same construction as that of Figure 1.

Figure 5 shows a tire having a separate tread 9. This tread is formed from a polyurethane having a high abrasion resistance and can be adhered to the remainder of the tire by means of an adhesive, such as a triisocyanate, or it may be attached to the remainder of the tire during the casting process.

It is to be understood that the invention is not concerned with the methods used in preparing the polyurethane per se. The invention resides in providing the tire from a novel assembly of polyurethanes. For this reason, the invention contemplates any substantially nonporous polyurethane plastic having the required physical properties. The nonporous polyurethane used for making the hard tread and the outer wall of the casing is prepared with somewhat less isocyanate than that required to prepare the softer inner wall of the casing. For best results, the tread should have an outer Shore A hardness of from about 85 to about 100 and preferably about 95. The outer side wall of the casing should preferably have a hardness within this range. The inner wall of the casing should have a Shore A hardness of from about 55 to about 65.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. A tire for vehicles having a tread and an outer wall of substantially nonporous, rubber-like polyurethane having a Shore A hardness of from about 85 to about 100, an inner wall of substantially nonporous, rubber-like polyurethane having a Shore A hardness of from about 55 to about 65 and a layer of rubber-like cellular polyurethane having a density of from about 20 to about 40 pounds per cubic foot lying between the outer and inner walls.

2. In a tire for vehicles made from a substantially, nonporous polyurethane, the improvement which comprises a layer of rubber-like cellular polyurethane sandwiched between inner and outer walls of said tire.

3. A tire for vehicles having a tread of substantially nonporous polyurethane, an outer wall of substantially nonporous polyurethane integral with said tread, a layer of cellular polyurethane adjacent said outer wall and an inner wall of substantially nonporous polyurethane.

4. A tire for motor vehicles adapted for use with a tube, said tire having a tread, an outer wall, inner wall and beads adapted to fit against the rim of a wheel, said inner wall, outer wall, beads and tread being molded from a substantially nonporous, rubber-like polyurethane, and sandwiched between the said walls, a layer of rubber-like cellular polyurethane.

5. A tire for vehicles comprising a tread of substantially nonporous polyurethane having a Shore A hardness of from about 85 to about 100, outer and inner side walls of substantially nonporous polyurethane and a layer of rubber-like cellular polyurethane sandwiched between said walls.

References Cited in the file of this patent

UNITED STATES PATENTS

| | | |
|---|---|---|
| 2,749,960 | Schwartz | June 12, 1956 |
| 2,753,642 | Sullivan | July 10, 1956 |